United States Patent [19]

Halasy-Wimmer et al.

[11] Patent Number: 5,829,557
[45] Date of Patent: Nov. 3, 1998

[54] ELECTROMECHANICALLY ACTUATED DISC BRAKE SYSTEM

[75] Inventors: Georg Halasy-Wimmer, Eschborn; Karlheinz Bill, Dreieich; Jurgen Balz, Oberlibbach; Lothar Kunze, Hofheim; Stefan Schmitt, Eltville, all of Germany

[73] Assignee: ITT Automotive Europe GmbH, Frankfurt, Germany

[21] Appl. No.: 619,769

[22] PCT Filed: Jul. 14, 1995

[86] PCT No.: PCT/EP95/02764

§ 371 Date: May 29, 1996

§ 102(e) Date: May 29, 1996

[87] PCT Pub. No.: WO96/03301

PCT Pub. Date: Feb. 8, 1996

[30] Foreign Application Priority Data

Jul. 21, 1994 [DE] Germany ............... 44 25 936.0
Mar. 28, 1995 [DE] Germany ............... 195 11 287.3

[51] Int. Cl.⁶ .......................... F16D 55/16; F16D 55/08; H02K 5/16
[52] U.S. Cl. ................ 188/162; 188/72.1; 188/72.7; 310/83
[58] Field of Search ................ 48/72.1, 72.2, 48/72.3, 72.7, 72.8, 106 A, 156, 158, 162, 163; 310/77, 80, 83, 93, 103, 109; 303/115.2; 74/424.8 R, 424.8 C; 318/372; 384/618, 619

[56] References Cited

U.S. PATENT DOCUMENTS

| | | | |
|---|---|---|---|
| 2,217,464 | 10/1940 | Arnold | 188/72.1 |
| 2,879,416 | 3/1959 | Blauz | 310/77 |
| 3,096,453 | 7/1963 | Behar | 310/77 |
| 3,402,308 | 9/1968 | Heuschke | 310/80 |
| 3,660,704 | 5/1972 | Paine et al. | 310/83 |
| 3,683,218 | 8/1972 | West | 310/80 |
| 4,201,935 | 5/1980 | Fukuma et al. | |
| 4,244,099 | 1/1981 | Haydan | 310/83 |
| 4,603,594 | 8/1986 | Grium | 188/106 P |
| 4,804,073 | 2/1989 | Taig et al. | 188/72.8 |
| 4,809,824 | 3/1989 | Fargier et al. | 188/162 |
| 4,836,338 | 6/1989 | Taig | 188/72.1 |
| 4,850,457 | 7/1989 | Taig | 188/72.7 |
| 4,850,459 | 7/1989 | Johannesen et al. | 188/162 |
| 4,865,162 | 9/1989 | Moms et al. | 188/158 |
| 5,382,858 | 1/1995 | Sugiyama | 310/83 |
| 5,441,350 | 8/1995 | Fujita | 384/619 |

FOREIGN PATENT DOCUMENTS

| | | |
|---|---|---|
| 0394238 | 10/1990 | European Pat. Off. |
| 3325801 | 1/1985 | Germany |
| 3810012 | 10/1988 | Germany |
| 3836255 | 4/1990 | Germany |
| 4023705 | 1/1992 | Germany |
| 4300512 | 7/1994 | Germany |
| WO8903490 | 4/1989 | WIPO |
| WO8903782 | 5/1989 | WIPO |
| WO9003905 | 4/1990 | WIPO |

*Primary Examiner*—Robert J. Oberleitner
*Assistant Examiner*—Chris Schwartz
*Attorney, Agent, or Firm*—J. Gordon Lewis; Thomas N. Twomey

[57] ABSTRACT

An electromechanically actuated disc brake system for motor vehicles comprising a floating caliper and an actuating unit mounted with the caliper. The actuating unit is an electric motor which, by interpolation of a reducing gear, powers an actuating element, which in turn controls one of two sliding friction linings mounted inside the brake caliper, to interact with the disc brake. With the intent to reduce axial dimensions of the actuating unit, the present invention includes an electric motor with a rotor of ring-shaped design to radially surround the reducing gear.

15 Claims, 5 Drawing Sheets

ELECTROMECHANICALLY ACTUATED DISC BRAKE SYSTEM

TECHNICAL FIELD

The invention relates to disc brakes and more particularly relates to actuated disc brake systems for motor vehicles with brake calipers and an actuating unit.

BACKGROUND OF THE INVENTION

A disc brake of this particular type is known from EP-D394 238 B1. Here, the actuating unit consists of an electric motor working with a planetary gear, and its planetary wheels powering a ring wheel. The ring wheel's rotational motion is transmitted, via bearing elements, to an actuating bush, thus causing its axial displacement or shift which, in return, causes the actuating element's respective friction lining to interact with the disc brake. The electric motor and planetary gear are positioned side by side in the disc brake's path of actuation. One disadvantage of all known, electromechanically actuated, disc brakes is the considerable axial extension of the actuating unit.

It is the intent of the submitted invention to improve on an electromechanical disc brake of the type mentioned above, with special emphasis put on reducing the axial dimensions of the actuating mechanism.

Its conceptual problem is solved in that the electric motor's rotor is of ring-shaped design, radially surrounding the reducing gear. The functionality of such an electromechanically actuated disc brake is unique in its strong dynamics of brake actuation and extremely compact design, allowing the transmission of high-density, mass-intensive braking power.

Practical application of the invention calls for the reducing gear to be a threaded roller pinion, with its threaded nut transmitting power to the rotor. An economically advantageous refinement has the threaded roller pinion designed as one featuring axial return of the rollers. It is of special convenience to have the actuating element represented by the spindle of the threaded roller pinion.

In order to achieve a considerable reduction in the electric motor's required torque, the power exchange between rotor and threaded nut is conducted by means of a planetary gear, with its sun wheel deployed at the rotor, while the planetary wheels are located at the threaded nut. The internal toothing of the brake calipers represents the hollow wheel of the planetary gears, interacting with the planetary wheels. It is of advantage to have available, between rotor and gear nut, a needle bearing and ball bearing configuration, under which the radial external track of the ball bearing is situated in the rotor and the radial internal track is, at least partially, situated in the threaded nut. Such arrangement makes possible a reduction in electric waste and an enlargement of the rotor's angle—quite advantageous for deployment of the threaded spindle as a requirement for the lining's positioning.

The smooth transmission of the electric motor's actuating power is achieved through cooperation of the spindle with a power transmission plate which is installed on the direct-actuated side of the friction lining.

A substantial reduction in efficiency loss, due to friction being present in the threaded roller pinion, is realized by installing a plunger rod (or pressure bar) between the threaded spindle and power transmission plate.

An even transmission of compressive forces between threaded spindle and power transmission plate is achieved by partially installing the plunger rod inside the threaded spindle, and securing it by way of two spherical caps. The first of these is intended to be mounted in the threaded spindle, with the other on the axial extension of the power transmission plate. Ideally, the first of the spherical caps should be mounted at the center point of the threaded spindle's axial length, and/or within the space defined by the spindle's thread rollers.

A further characteristic is the establishment of a connection of torsional strength between thread spindle and the power transmission plate, allowing smooth transmission of torsional momentum resulting from brake application force. It is achieved through the deployment of a metallic bellows between the threaded spindle and power transmission plate, which is placed coaxially to the plunger rod, and firmly attached to the threaded spindle and power transmission plate, preferably by welding.

The electric motor's hollow shaft, integrated in the actuating unit, is optimally positioned because the screw threaded nut exhibits radial expansion, enabling it to be supported by a radial bearing (it being designed as a cross shaft bearing and/or four-point bearing). The bearing's inner ring should be determined by the circumferential dimension of the expansion. Its ability to absorb high axial and radial forces and stalls or lock-ups adds to a further stabilization of the hollow shaft.

The electric motor has the versatility to operate as either a permanent magneto-excited, electronically commutating electric motor (torque), or a connected reluctance motor (SR).

The mentioned motor types are especially suitable for generating high torque when in standstill mode.

To find a good location for placement of the rotor, particularly under utilization of the mentioned torque motors, the invention provides for a contact-free resolver (angle indicator), which works in concert with the reducing gear and pinpoints the actuating element's location. The resolver may be made up of two rings with electric windings, spaced by an air gap. One of the rings, preferably the radial inner ring, should be firmly attached to the rotor, while the other is installed in the housing, with torsional strength intact. Such a resolver affords high definition; hence, a targeted braking process of optimal increments eases the precise positioning of the friction lining.

The resolver's initial signal can at the same time be used for commutation of the torque motor.

Another characteristic variation of the concept is available, whereby a readjusting spring is inserted between the screw thread nut and the spindle which, following the rotational motion, allows the thread nut a counter-rotational motion step. The feature prevents the brake to remain in its actuated state, brought about by its own hysteresis, e.g. after power failure. The remaining brake impulses are essentially eliminated.

Another characteristic is the presence of a torsion retainer/equalizer, located between the power transmission plate and the first friction lining. For example, the deployment of a lining support spring, installed on hydraulic-actuated disc brakes with friction lining, can serve as a torsion retainer.

To ensure confirmation of contact between the friction lining and disc brake, contact sensor pins are embedded in the friction lining to measure electric resistance between the disc and lining. They further serve the purpose of monitoring the lining's wear and tear.

To effectively protect the actuating mechanism from soilage, like splashing water, an elastic sealer element is located between the housing and actuating element (spindle).

DETAILED DESCRIPTION OF THE PREFERRED EMBODIMENTS

Figure 1:
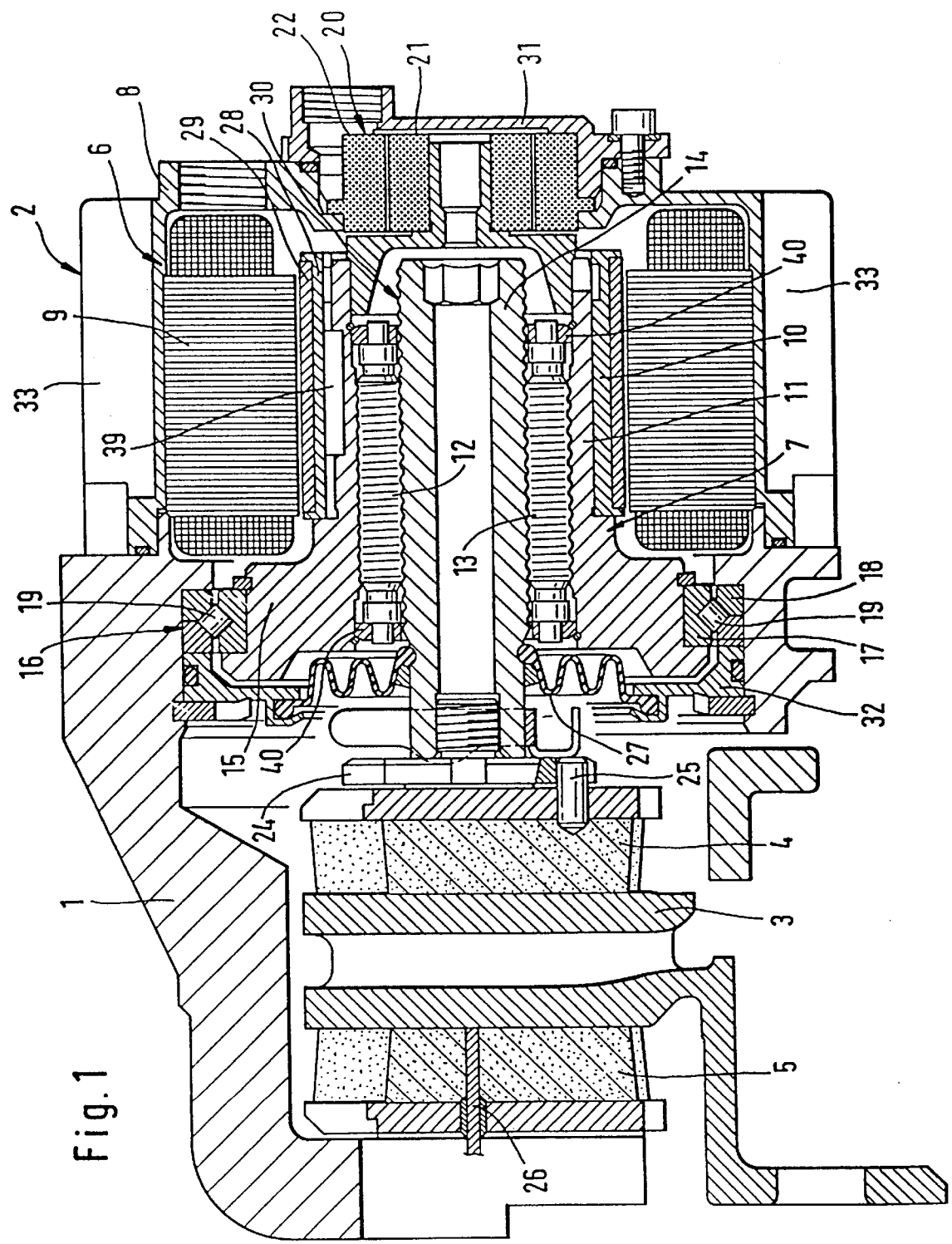
FIG. 1 A cross section of the first embodiment of the electromechanically actuated disc brake of the present invention.

Now referring to FIG. 1 which shows the disc brake as a floating caliper disc brake. It is composed essentially of a sliding caliper 1, mounted in a rigid frame (not shown here) and an actuating unit 2, with its housing 8 attached to caliper 1 (again, mounts not shown). A set of friction linings 4 and 5 one positioned on caliper 1 in a manner so as to be in juxtaposition to the left and right flat surfaces of disc brake 3.

Subsequent descriptions will refer to friction lining 4, shown right in the drawing, as first friction lining, with friction lining 5 designated second.

While contact of friction lining 4 with disc brake 3 is under direct control of actuating unit 2 and its actuating element 30, the reactive pressure forces springing from actuation of brake caliper 1, will cause lining 5 to press against the opposite surface of brake disc 3.

The previously mentioned actuating unit 2 is composed of an electric motor 6, which in the example is represented as a permanent magneto-excited, electronically commutating (torque) motor, with stator 9 rigidly fixed in housing 8 and rotor 10 (or hollow shaft) being fermed by ring-shaped support 28 which is equipped with several permanent magneto-segments 29. Between torque motor 6 and above mentioned actuating element 30 (preferably deployed coaxially to motor 6), a reducing gear is positioned. It is displayed in the example as threaded roller pinion 11 and 14, and consists of a screw threaded nut 11 and a threaded spindle 14. Parallel axis threaded rollers 12 and 13 are arranged in threaded nut 11. The threaded rollers will, during rotational motion of threading nut 11, rotate in planetary mode without axial shift, and will set in axial motion the threaded spindle 14. Radial guidance of threaded rollers 12 and 13 is assured by two guide disks 40, located at the ends of threaded rollers 12 and 13, and toothed wheel rims (not shown).

The mentioned actuating unit 2 consists of electric motor 6, shown in the example as permanent magneto-excited, electronically commutating (torque) motor, with its stator rigidly fixed in housing 8. Its rotor 10 and/or hollow shaft is formed by a ring-shaped support 28, equipped with several permanent magneto-segments 29. Between torque motor 6 and previously mentioned actuating element 30 (preferably arranged in coaxial fashion to motor 6), a reducing gear is installed, which is displayed as threaded roller pinion 11 to 14. The threaded roller pinion 7 consists of a threaded nut 11 and a threaded spindle 14, within which threaded unit 11 is axially parallel to threaded rollers 12,13. These will, during rotational motion of threaded nut 11, rotate in planetary fashion without axial shift and will set in axial motion threaded spindle 14. Two guidance discs 40 are arrayed at the ends of threaded rollers 12,13 to provide radial guidance. The additional toothed wheel rims are not shown.

The most suitable arrangement has rotor 10 of torque motor 6 connected under torsional strength to threaded nut 11 by inclusion of a feather key 39. Threaded spindle 14 constitutes actuating element 30, which under assistance of power transmission plate 24 actuates the first friction lining 4. A torsion retainer 25 is preferably inserted between power transmission plate 24 and the first friction lining 4. Torsion retainer 25 consists of a pin embedded in friction lining 4, and will plug into an inlet allowed for in power transmission plate 24. A radial bearing supported by caliper 1 controls reducing gear 7 and hollow shaft or rotor 10. The radial bearing in the example shown is a cross roller bearing 16. It consists of a bearing's external ring 18 (shown in FIG. 1 in divided form), a bearing's internal ring arrayed on a collar-shaped radial expansion 15 of threaded nut 11, and several cylinder rollers 19 arrayed between bearing rings 17,18. The bearing rings 17,18 form four interconnected tracks, showing at a 45° pitch relative to the bearing level, and/or two sets of twin tracks, offset by 90°, where cylinder rollers 19 (in X-arrangement) alternately roll off on one of the twin tracks.

Because the used cross roller bearing can handle any combination of axial, radial, and stalled loads, a second bearing is redundant.

A four-point bearing may replace a cross roller.

To position threaded roller pinion 7 exactly and control signals for electronic commutation of torque motor 6, housing 8 in actuating unit 2 contains a resolver 20.

In the given example, a resolver consists of two coaxial rings 21,22, which are equipped with electric windings and are spaced by an air gap. The radial internal ring 21 is linked to threaded nut 11 by means of an intermediate member 61 while the other ring 22 is installed for torsional strength in housing 8.

For the purpose of clearly recognizing contact between friction linings 4,5 and brake disc 3, the former have been equipped with contact pins 26. The interior of housing 8 is protected by a cover 31, located nearby resolver 20, and is additionally protected by an elastic, membrane-like sealer 27 to guard against soilage from splashing water. Sealer 27 is best inserted between actuating unit 30 or threaded spindle 14, and a retaining ring 32, axially positioned on the bearing's external ring 18.

To dissipate generated heat of torque motor 6 operations, housing 8 is equipped with large-scale cooling ribs 33.

Figure 2:
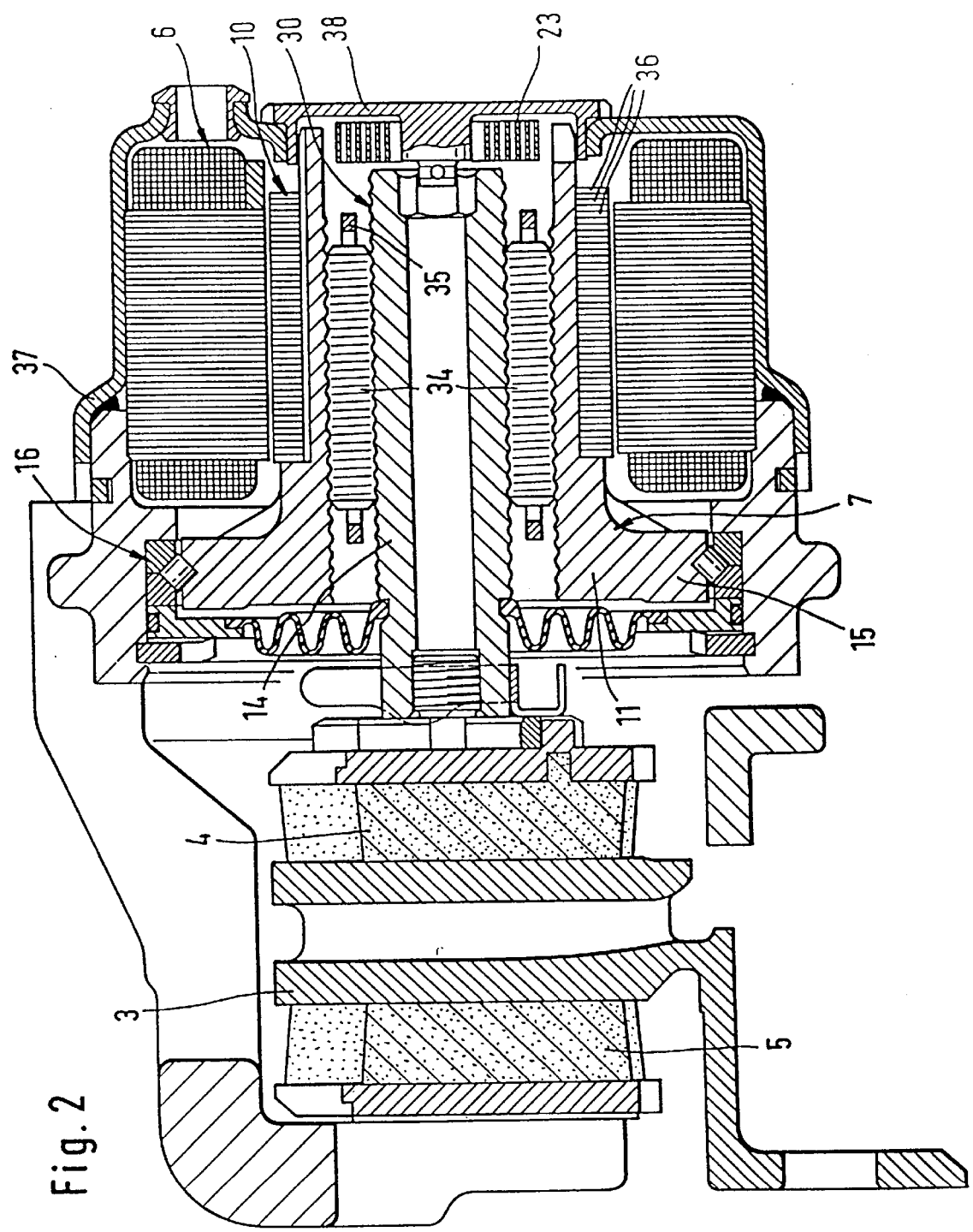
FIG. 2 Complementary to FIG. 1, a second version of the subject.
Figure 3:
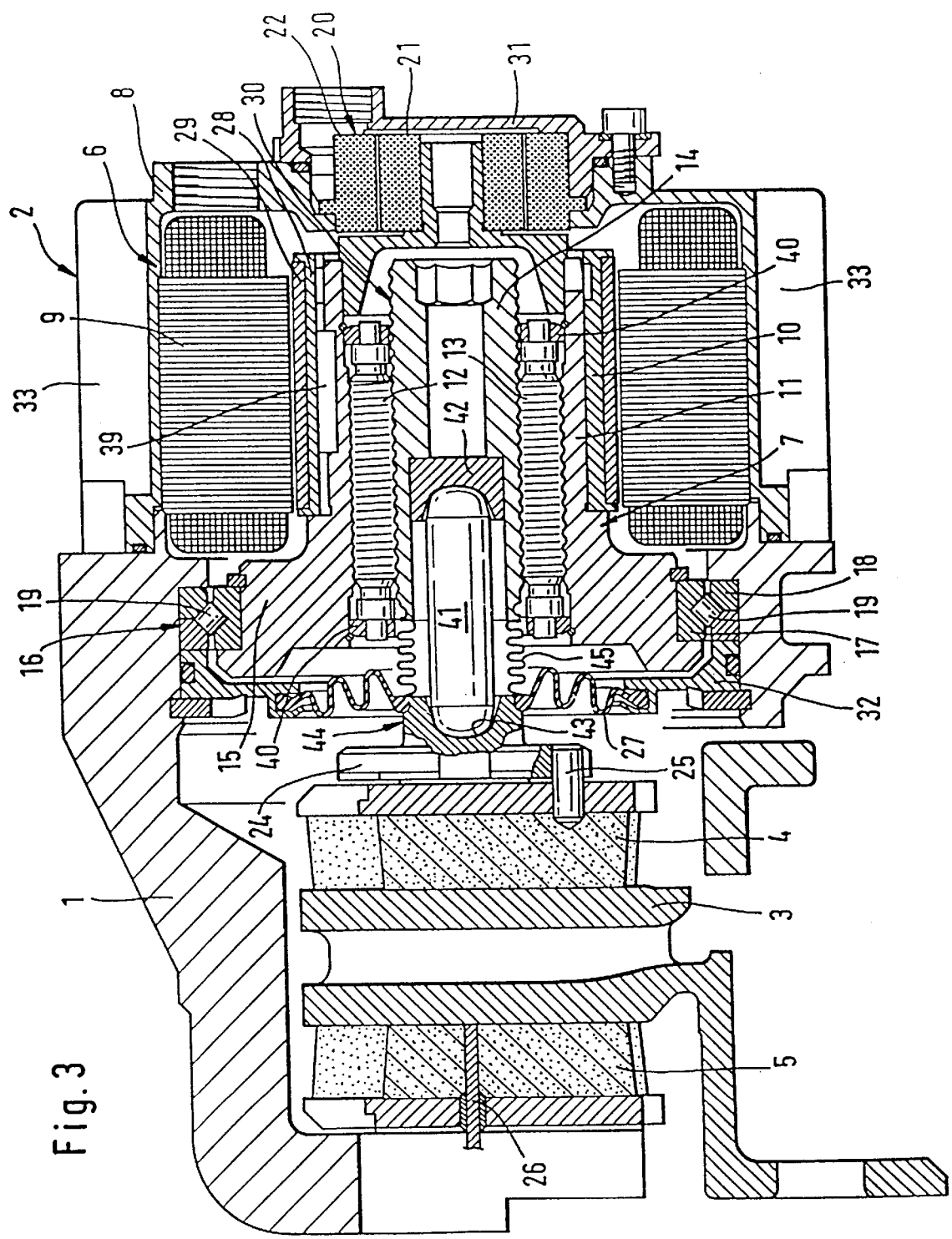
FIGS. 3,4,5 The third, fourth, and fifth versions of the subject, complementary to FIG. 1.

The embodiment of FIG. 2 shows the actuating unit 2 being powered by a connected reluctance motor (SR-motor). The bearing's internal ring or the radial interior twin tracks of mentioned cross roller bearing is formed by the circumferential dimension of expansion 15 of threaded nut 11. Because of its single-piece design, the internal bearing ring with threaded nut 11 is of higher operating precision, and less installation is involved, with modular assembly possible. The reducing gear 7 is, in FIG. 2, displayed as a threaded roller pinion with axial return of rollers 34, which are positioned in a cage 35, holding them parallel to threaded spindle 14 and equidistant to the spindle's circumference. The threaded rollers 34 conclude their circuit to arrive at an axial nut (not shown) inside threaded nut 11 to separate from both threaded nut 11 and the spindle's thread. The axial return of rollers 34 to their original position is controlled by cams (not shown) inside the nut's thread. Rotor 10 of the SR motor is made up of several ring-shaped rotor metal units 36, attached across on threaded nut 11, and interlocking for torsional strength. The second version of the invention's SR motor is resistant to higher temperatures, which eliminates the need for cooling ribs on housing 8 of actuating unit 2.

To prevent remaining brake momentum, after the act of braking, to affect the wheel if a failure of control electronics occurs through hysteresis of the actuating unit, a spiralshaped readjusting spring 23 is provided which installs between threaded nut 11 and a cover, closing off the motor housing. The readjusting spring moves the threaded nut 11 counter to the actuated rotational direction, enabling friction linings 4,5 to lift off brake disc 3. For uniform initiation of actuating forces on friction linings 4,5 in housing 8 of the actuating unit, caliper 1 must be massively dimensioned. To reduce flexural impact of friction linings 4,5 on housing 8 of actuating unit 2, it is recommended to design caliper 1 as a framed caliper. Thus, only pulling forces enter the housing, without imposing flexural tension within the support base of actuating unit's 2 bearing.

The invention's third embodiment demonstrates the transmission of pressure forces between threaded spindle 14 and power transmission plate 24 via threaded spindle 14, partially located inside plunger rod 41, and being mounted in two spherical caps 42. The first is positioned at the center of threaded spindle's 14 axial length (between threaded rollers 12,13) while the second spherical cap 43, being nearer to friction lining 4 rests in the axial extension 44 of power transmission plate 24. Furthermore, between power transmission plate 24 and/or its extension 44 and threaded spindle 14, a metallic bellows 45 is welded to both parts, which provides a connection of torsional strength for transmission of torsional momentum, resulting from the brake application forces generated by the threaded spindle.

Figure 4:
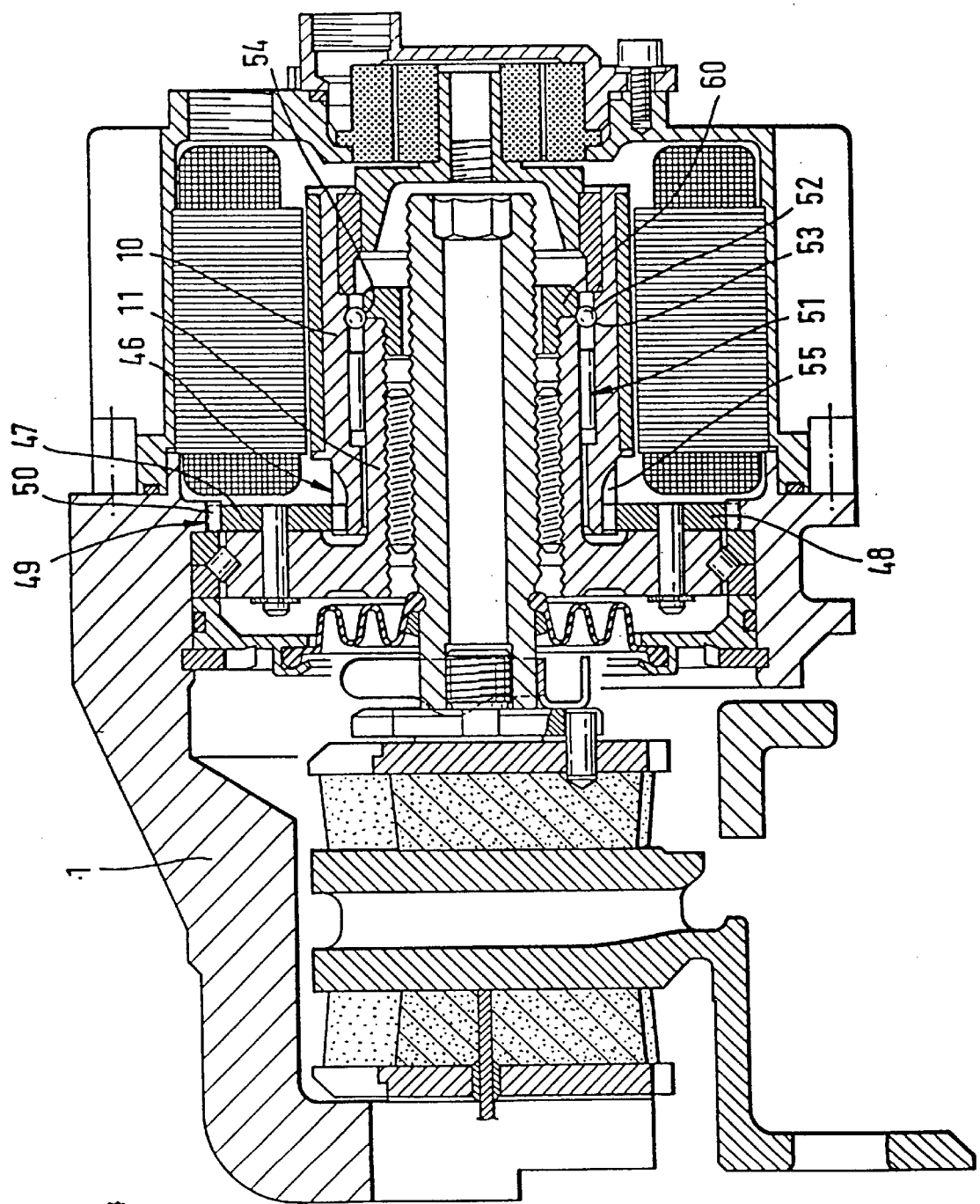

Now referring to FIG. 4, a reduction of the required motor momentum is achieved in the fourth embodiment of the present invention by purposeful integration of a planetary gear 46,47,48,49. Deployed most effectively between rotor 10 and threaded nut 11, the planetary gear consists of a sun wheel 46, formed on rotor 10 in external toothed arrangement 55, several planetary wheels (two of them depicted with reference numbers 47 & 48) and a hollow wheel 49, formed by internal toothing 50 in caliper 1. The mounting of the rotor 10 on threaded nut 11 takes place by combination of a schematic needle bearing 51 and a ball bearing 52, with its radial external track 53 contained in rotor 10, while its internal track 54 is laid out partially at the end of threaded nut 11, and partially on bush 60. This facilitates the selection of a spindle thread with steeper pitch for greater effect.

OPERATION OF THE DEVICE

When the stator 9 is excited, the rotor 10 starts rotating. Presuming the direction of the stator's rotation be counter-clockwise in a view from the right side of the drawing. Then the lower part of the rotor 10 moves into the plane of the picture, while the upper part moves out of the picture plane. With its external toothed arrangement 55, the rotor engages the planetary wheels 47 and 48 which consequently rotate in a clockwise direction. Thus, they move along the internal toothing 50 of the static hollow wheel 49 in a counterclockwise direction. Since the axles of the planetary wheels 47 and 48 are born on the collar-shaped radial extension 15 of the threaded nut 11, the threaded nut 11 will rotate along with the planetary wheel axles in a counterclockwise direction. This causes the threaded rollers 12 and 13 to rotate counterclockwise as well. The threaded rollers 12 and 13 are provided with right-hand threads which, during a counterclockwise rotation, shift the threaded spindle 14 to the left, for it is secured against rotation. In this way, brake lining 4 is brought into contact with the brake disc, while brake lining 5 is pressed against the brake disc by reactive pressure forces as described in connection with FIG. 1. The brake linings are released by a clockwise rotation of the rotor 10.

Figure 5:
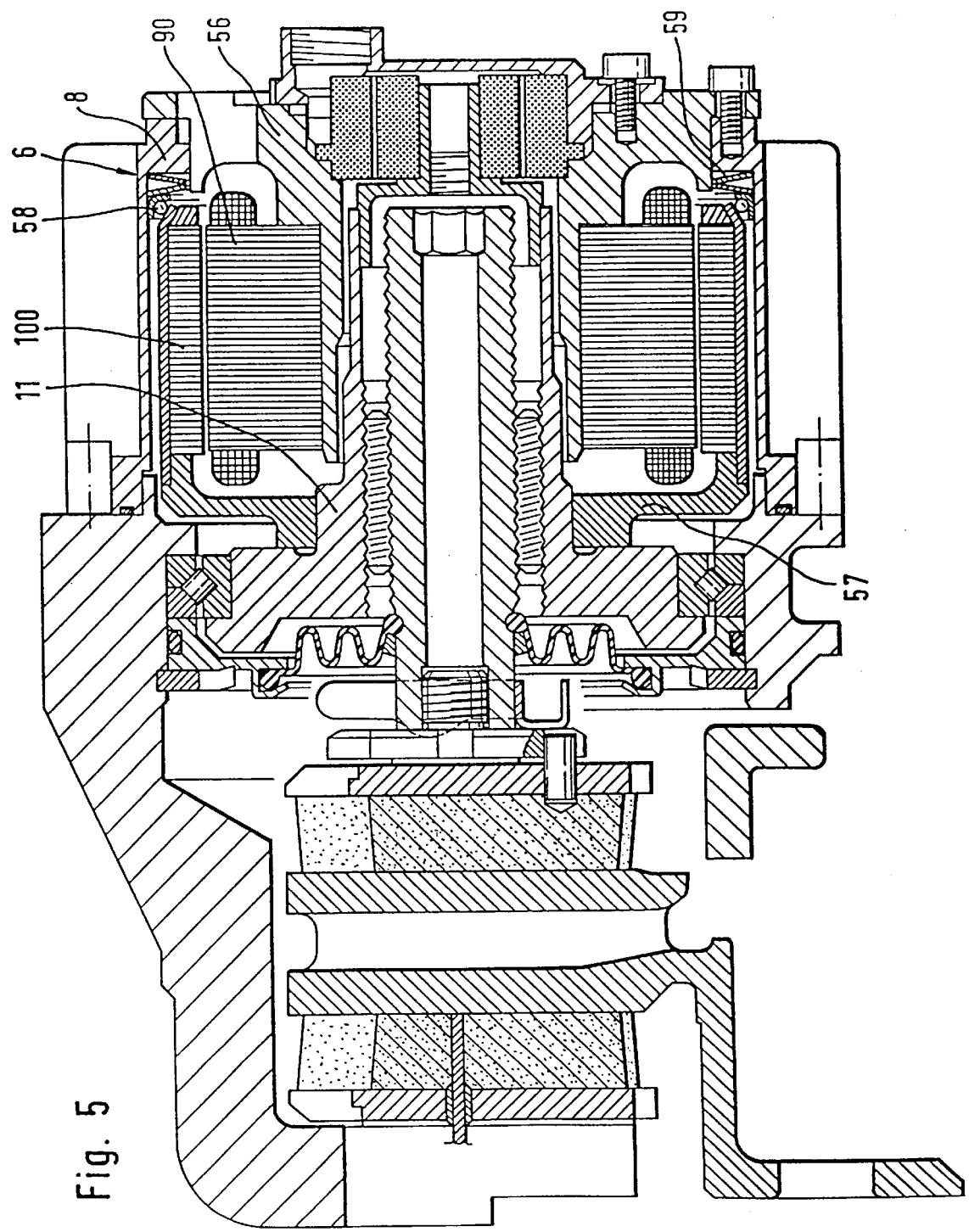

FIG. 5 of the drawing demonstrates the invention's fifth embodiment, when electric motor 6 is designed as an externally operating motor. In the next example shown, the electric motor's 6 stator 90 is fused locally to cylindrical part 56 in housing 8. Operating heat is released via part 56 to housing 86. Rotor 100, enclosing stator 90, is linked to threaded nut 11 per bell-shaped flange 57, and thus mounted on the same side. To assure utilization of even small air gaps between rotor 100 and stator 90, the rotor 100 on the drawing's right side is mounted with a radial bearing 58 in housing 8, which by use of a (Belleville) spring washer 59 finds axial support on housing 8.

We claim:

1. An electromechanically actuated disc brake system for motor vehicles including a caliper and an actuating unit attached to the caliper, wherein the caliper is adapted to engage two friction linings, each interacting with a respective disc surface, wherein one of the friction linings is direct-controlled by an actuating element, comprising:

an electric motor, mounted coaxially to the actuating element, and a reducing gear assembly, mounted between the electric motor and the actuating element wherein the electric motor includes a ring-shaped rotor which surrounds the reducing gear assembly in radial fashion, wherein the reducing gear assembly is designed as a threaded roller pinion having a threaded nut linked to the rotor for the purpose of power transmission which is executed via a planetary sear assembly, with a needle bearing and a ball bearing located between the rotor and the threaded nut, each bearing having an internal and an external radial track, wherein the ball bearing's external radial track is defined in the rotor, and its internal radial track is partially defined in the threaded nut.

2. An electromechanically actuated disc brake system, according to claim 1, wherein the threaded nut includes a radial expansion to facilitate its support on a radial bearing.

3. An electromechanically actuated disc brake system, according to claim 2, wherein the radial bearing is designed as a cross roller bearing.

4. An electromechanically actuated disc brake system, according to claim 3,wherein the radial expansion of the threaded nut accommodates an internal ring of the radial bearing.

5. An electromechanically actuated disc brake system, according to claim 2, wherein the radial bearing is designed as a 4-point bearing.

6. An electromechanically actuated disc brake system, according to claim 1, wherein the actuating element is formed by a spindle of the threaded roller pinion.

7. An electromechanically actuated disc brake system, according to claim 6, wherein the spindle operates in concert with a power transmission plate governing the functions of the direct-controlled friction lining.

8. An electromechanically actuated disc brake system, according to claim 6, wherein the spindle includes a radial keyway on its side, facing the friction lining.

9. An electromechanically actuated disc brake system, according to claim 1, further including a resolver working together with the reducing gear for the purpose of monitoring the actuating element's position.

10. An electromechanically actuated disc brake system, according to claim 9, wherein the resolver consists of an internal ring and an external ring, each with electric winding and spaced from each other by an air gap, with the internal ring firmly connected to the rotor, and the external ring connected to a housing accomodating the actuating unit.

11. An electromechanically actuated disc brake system, according to claim 1, wherein the threaded roller pinion is designed as a threaded roller pinion with means for axial return.

12. An electromechanically actuated disc brake system, according to claim 1, wherein the planetary gear assembly includes a sunwheel, a plurality of planetary wheels, and an internally toothed hollow wheel, and the sun wheel is positioned at the rotor, while the planetary wheels are attached to the threaded nut, interacting with the internal toothing of the hollow wheel.

13. An electromechanically actuated disc brake system, according to claim 1, wherein the electric motor is designed as an externally operating motor, with a stator firmly attached to the caliper.

14. An electromechanically actuated disc brake system, according to claim 1, wherein the electric motor is designed as a permanent magneto-excited, electronically commutating electric motor.

15. An electromechanically actuated disc brake system, according to claim 1, wherein the electric motor is designed as a connected reluctance motor.

* * * * *

UNITED STATES PATENT AND TRADEMARK OFFICE
CERTIFICATE OF CORRECTION

PATENT NO. : 5,829,557
DATED : 11/3/98
INVENTOR(S) : Halasy-Wimmer et al.

It is certified that error appears in the above-indentified patent and that said Letters Patent is hereby corrected as shown below:

Claim 1, Col. 6, Line 31, please change the word "sear" and replace with --gear--.

Signed and Sealed this

Sixteenth Day of March, 1999

Attest:

Q. TODD DICKINSON

Attesting Officer     Acting Commissioner of Patents and Trademarks